Patented Mar. 31, 1942

2,277,891

UNITED STATES PATENT OFFICE 2,277,891

STABLE ZEIN SOLUTION

Oswald C. H. Sturken, Closter, N. J., assignor to Corn Products Refining Company, New York, N. Y., a corporation of New Jersey No Drawing. Application August 5, 1939, Serial No. 288,589

12 Claims. (Cl. 106—152)

This invention relates to zein solutions for coating and impregnating purposes, for example; and the object of the invention is to provide a zein solution which will be stable, that is to say, which on standing for long periods of time will not gel.

A zein solution is gelled or denatured by the presence of water. The solvent most commonly used for making zein solutions is ethyl alcohol of 95% concentration or less, that is, having a water content, by volume, of 5% or more. Commercial or air dry zein also contains moisture to the extent of 6%–8% or more, according to weather conditions and other factors. A zein solution using 95% ethyl alcohol made from air-dry zein, having about the moisture content indicated, will gel in a relatively short time.

According to the present invention the zein used is dried so as to remove its natural moisture and the solvent employed is composed of anhydrous ethyl alcohol and a substance or substances containing abietic acids, which term is intended to include rosin which is composed largely of abietic acids and also hydrogenated abietic acids, such as hydrogenated rosin and glycerated abietic acids, such as the ester gums.

Zein is insoluble in anhydrous ethyl alcohol alone, but is readily soluble in anhydrous ethyl alcohol in the presence of rosin, or its equivalent, as specified above, as the applicant has discovered. On the basis of this discovery, a zein-ethyl alcohol solution may be made which is substantially water free and will remain stable for long periods of time. The solution, therefore, need not be used as soon as made, but can be kept for relatively long periods of time without deterioration.

The invention is exemplified in the following specific example in which the proportions of the ingredients are by weight:

*Example*

| | Parts |
|---|---|
| Dried zein | 100 |
| Anhydrous ethyl alcohol | 237 |
| Rosin | 100 |

The rosin is first dissolved in the ethyl alcohol and the zein dissolved in the ethyl alcohol-rosin solvent.

A solution made in accordance with the above prescription remained fluent and had not gelled after standing seventy-two days.

The minimum amount of ethyl alcohol is about 79% based on the zein. The minimum amount of rosin is about 50%. There are no upper limits to the alcohol or rosin.

In place of rosin one may use hydrogenated rosin or ester gums in substantially the same quantities.

The above example is to be considered as merely informative and typical. The intention is to cover all equivalents and all modifications within the scope of the appended claims.

I claim:

1. A stable, non-gelling solution which is substantially water free and which contains zein, ethyl alcohol and an abietic acid containing substance in quantity to make the zein soluble in anhydrous alcohol.

2. A stable, non-gelling solution which is substantially water free and which contains zein, ethyl alcohol and a substance in quantity to make the zein soluble in anhydrous alcohol of the group consisting of rosin, hydrogenated rosin and ester gum.

3. A stable, non-gelling solution which is substantially water free and which contains zein, ethyl alcohol together with rosin in quantity to make the zein soluble in anhydrous alcohol.

4. A stable, non-gelling solution which is substantially water free and contains zein, ethyl alcohol not substantially less than 79%, based on the zein, and an abietic acid containing substance not less than 50%, based on the zein in quantity to make the zein soluble in anhydrous alcohol.

5. A stable, non-gelling solution which is substantially water free and contains the following substances in the quantities by weight substantially as follows: zein 100 parts; ethyl alcohol not less than 79 parts; and rosin not less than 50 parts in quantity to make the zein soluble in anhydrous alcohol.

6. A stable, non-gelling solution which is substantially water free and contains the following substances in quantities by weight substantially as follows: zein 100 parts; ethyl alcohol 237 parts; and rosin 100 parts in quantity to make the zein soluble in anhydrous alcohol.

7. A stable, non-gelling solution which is substantially water free and contains the following substances in quantities by weight substantially as follows: zein 100 parts; ethyl alcohol 237 parts; and a substance in quantity to make the zein soluble in anhydrous alcohol of the group consisting of rosin, hydrogenated rosin and ester gum 100 parts.

8. A stable, non-gelling solution which is substantially water free and contains the following substances in the quantities by weight substantially as follows: zein 100 parts; ethyl alcohol not less than 79 parts; and a substance in quantity to make the zein soluble in anhydrous alcohol of the group consisting of rosin, hydrogenated rosin and ester gum not less than 50 parts.

9. Process of making a stable non-gelling alcoholic zein solution which comprises removing from the zein its natural moisture; dissolving an abietic acid containing substance in anhydrous ethyl alcohol; and then dissolving zein in the solvent consisting of anhydrous ethyl alcohol and the abietic acid containing substance.

10. A stable, non-gelling solution composed of the following substances: substantially water-free zein; anhydrous alcohol; and an abietic acid containing substance in quantity to make the zein soluble in the anhydrous ethyl alcohol.

11. A stable, non-gelling solution composed of the following substances: substantially water-free zein; anhydrous alcohol; and rosin in quantity to make the zein soluble in anhydrous ethyl alcohol.

12. A stable, non-gelling solution composed of the following substances: zein and ethyl alcohol which together contain insufficient water to effect a solution of the zein in the alcohol; and an abietic acid containing substance in quantity to make the zein soluble in said ethyl alcohol.

OSWALD C. H. STURKEN.